US008000731B2

(12) United States Patent
Varotto et al.

(10) Patent No.: US 8,000,731 B2
(45) Date of Patent: Aug. 16, 2011

(54) SYSTEM AND METHOD FOR MANAGING AFFILIATION REQUESTS IN A COMMUNICATION SYSTEM

(75) Inventors: Hugo L. Varotto, Renton, WA (US); Joseph E. Baum, Cary, IL (US); Nadeem Z. Kureishy, Huntley, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 412 days.

(21) Appl. No.: 12/262,311

(22) Filed: Oct. 31, 2008

(65) Prior Publication Data

US 2010/0113079 A1 May 6, 2010

(51) Int. Cl.
*H04B 7/00* (2006.01)
(52) U.S. Cl. ......... 455/517; 455/519; 455/515; 455/509
(58) Field of Classification Search .................. 455/518, 455/517, 515, 519, 414.1, 414.2, 452.1, 426.1, 455/464, 509, 520, 416; 370/310, 322
See application file for complete search history.

(56) References Cited

U.S. PATENT DOCUMENTS

| 6,847,827 B2 * | 1/2005 | Helm et al. ............... 455/509 |
| 2002/0102999 A1 * | 8/2002 | Maggenti et al. ......... 455/518 |
| 2003/0181213 A1 | 9/2003 | Sugar et al. |
| 2004/0125777 A1 | 7/2004 | Doyle et al. |
| 2006/0203837 A1 | 9/2006 | Shvodian |
| 2007/0173273 A1 * | 7/2007 | Gogic ........................ 455/518 |
| 2008/0037723 A1 | 2/2008 | Milstein et al. |
| 2008/0181145 A1 * | 7/2008 | Chowdhury et al. ......... 370/310 |

OTHER PUBLICATIONS

PCT International Search Report Dated May 28, 2010.

* cited by examiner

*Primary Examiner* — John Lee
(74) *Attorney, Agent, or Firm* — Terri S. Hughes; Valerie M. Davis

(57) ABSTRACT

A system and method for managing call affiliation in a communication system having a plurality of communication units. When a public call announcement is initiated, a broadcast data message is transmitted to the communication units identifying a public announcement talkgroup for the call. Upon receiving the broadcast data message, each of the communication units waits a random amount of time before attempting to affiliate to the public announcement talkgroup. At the same time, each communication unit also monitors other messages on the control channel. Each communication unit joins the public announcement talkgroup upon the first of either (1) receiving an affiliation grant in response to an affiliation request transmitted by the communication unit, or (2) detecting an affiliation grant being transmitted to a different communication unit attempting to affiliate to the same talkgroup.

20 Claims, 4 Drawing Sheets

SYSTEM AND METHOD FOR MANAGING AFFILIATION REQUESTS IN A COMMUNICATION SYSTEM

TECHNICAL FIELD OF THE DISCLOSURE

This disclosure relates generally to communication systems, and more particularly, to a system and method for managing affiliation requests in a communication system.

BACKGROUND OF THE DISCLOSURE

Wireless communication systems generally comprise a set of radios and a set of base sites. The radios, which may be mobile radios, portable radios or the like, are generally the endpoints of a communication path, while base sites are typically stationary intermediates by which a communication path to a radio device is established or maintained.

During operation of a communication system, there are instances where it is desirable to provide voice communication to multiple users in the communication system. For example, in transit systems (e.g., communication systems for public transportation vehicles), radios typically operate in a data only mode. If a dispatcher desires to establish a voice call to many or all of the vehicles (also referred to as a Public Announcement Call), the dispatcher can initiate transmission of a broadcast data message to the vehicles that are to receive the public announcement. Upon receiving this broadcast data message, application software coupled to the radio interprets the message and instructs the radio to affiliate to a public announcement channel. The radio then attempts to do so by transmitting an affiliation request to the base site.

Such systems, however, has several drawbacks. For example, in systems with large numbers of radios, affiliation requests sent immediately from multiple radios may collide and interfere with one another. Even if the radios are configured to retry, such collisions may continue to happen, thus preventing many radios from being able to properly affiliate to the public announcement talkgroup. Additionally, even if all of the radios can be affiliated, it takes a significant amount of time to process affiliation requests from all radios in the communication system and to provide affiliation grants back to each such radio. As such, the communications system must incorporate a significant delay between the broadcast data message announcing the public announcement call and the initiation of the call to provide sufficient time to handle all the affiliation requests and grants.

BRIEF DESCRIPTION OF THE FIGURES

Various embodiment of the disclosure are now described, by way of example only, with reference to the accompanying figures.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve the understanding of various embodiments of the present disclosure. Also, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions with respect to their corresponding respective areas of inquiry and study except where specific meaning have otherwise been set forth herein.

DETAILED DESCRIPTION OF THE DISCLOSURE

The present disclosure provides a system and method for managing call affiliation in a communication system. When a public call announcement is initiated, a broadcast data message is transmitted to communication units identifying a public announcement talkgroup for the call. Upon receiving the broadcast data message, each of the communication units waits a random amount of time before attempting to affiliate to the public announcement talkgroup. This reduces the risk of collision between affiliation requests from multiple communication units. At the same time, each communication unit also monitors other messages on the control channel. If the communication unit notices an affiliation grant for another communication unit attempting to affiliate to the same talkgroup, the communication unit considers itself affiliated. As a result, multiple communication units can be affiliated to a public announcement talkgroup without requiring a separate affiliation grant for each communication unit.

Figure 1:
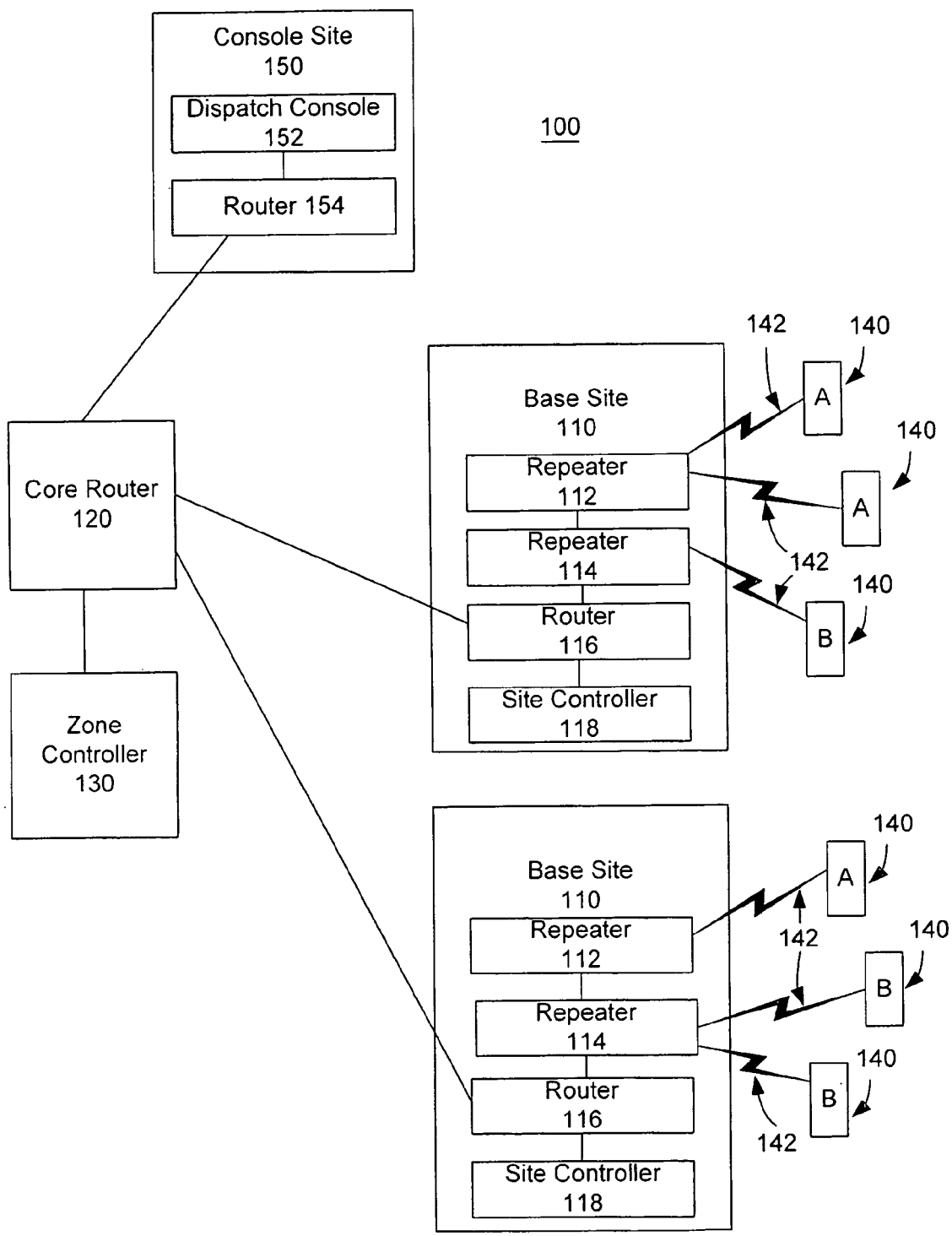
FIG. 1 illustrates one embodiment of a communication system in accordance with the present disclosure.

Let us now discuss the present disclosure in greater detail by referring to the figures below. FIG. 1 shows one embodiment of a single-zone in a communication system 100. The system 100 comprises a plurality of base sites 110 that are in communication with a core router 120. The core router 120 is also coupled to a zone controller 130. The zone controller 130 manages and assigns Internet Protocol (IP) multicast addresses for payload (voice, data, video, etc.) and control messages between and among the various base sites 110. The zone controller 130 is also responsible for assigning communication channels at the base sites 110.

As depicted in FIG. 1, each base site 110 comprises a plurality of repeaters 112, 114 that are coupled, for example via Ethernet, to an associated router 116, which is in turn coupled to the core router 120. Of course, while each base site 110 is illustrated having two repeaters 112, 114, it is understood that any number of repeaters may be provided at each base site 110. Each router 116 is also coupled to a site controller 118. The site controller 118 is configured to handle communication channel assignments for its respective base site 110 in the event the base site 110 is unable to communicate with the zone controller 130

The repeaters 112, 114 at each base 110 communicate, using wireless communication resources 142, with communication units 140 within a specific coverage area. The wireless communication resources 142 may comprise any type of communication resource such as, for example, radio frequency (RF) technologies, including, but not limited to Frequency Division Multiple Access (FDMA), Time Division Multiple Access (TDMA), Code Division Multiple Access (CDMA), Orthogonal Frequency Division Multiple Access (OFDMA), and the like. Other wireless technologies, such as those now known or later to be developed and including, but not limited to, infrared, Bluetooth, electric field, electromagnetic, or electrostatic transmissions, may also offer suitable substitutes.

The communication units 140 may be mobile or portable wireless radio units, cellular radio/telephones, video terminals, portable computers with wireless modems, or any other wireless devices. The communication units 140 may also be arranged into talkgroups having corresponding talkgroup identifications as known in the art. In FIG. 1, two separate talkgroups are illustrated, identified by labels "A" and "B." Of course, any number of talkgroups having corresponding talkgroup identifications may be established within the system 100. Although not shown in FIG. 1, each communication unit 140 may also include application software for receiving, decoding, and taking actions based on transmitted data messages. The application software may be integral to the radio or operated by a secondary device, such as a portable computer, that is coupled to the radio.

The core router 120 may also be further coupled to a console site 150. The console site 150 includes at least one dispatch console 152 that is coupled, for example, via Ethernet, to a router 154, which is in turn coupled to the core router 120. Console sites can affiliate with either or both talkgroups "A" and "B" and, accordingly, may be considered members of both talkgroups "A" and "B." Although not shown in FIG. 1, it will be appreciated that a single site may include both repeaters and dispatch consoles. In one embodiment, the base sites 110, the core router 120, the zone controller 130 and the dispatch site 150 may be coupled using T1 lines, E1 lines, fiber optic lines, wireless links, Ethernet links, or any other suitable means for transporting data between the various components.

Practitioners skilled in the art will appreciate that the system 100 may also include various other elements not shown in FIG. 1. For example, although only two base sites 110 and one console site 150 are illustrated in FIG. 1, the system may include any number of base sites 110 or console sites 150. The system 100 may include remote sites configured to provide simulcast transmissions. The system 100 may also include multiple interconnected zones, each containing a zone controller 130, base sites 110, and console sites 150. The system 100 may also be linked to a public switched telephone network (PSTN), a paging network, or a facsimile machine. The communication system 100 may also be connected to a number of additional content sources, such as the Internet or various Intranets.

In many communication systems, it is often necessary to have the capability to instruct communication units to switch between different modes of operation. For example, in transit-related applications where different communication units are assigned to different vehicles or operators, communication units typically operate in a data mode during which the communication units receive various transit-related data messages on a broadcast data channel. In this mode, the communication units are not capable of playing received voice messages. However, there are instances where a dispatcher or other individual may desire to initiate a voice call, such as a public announcement, in order to send a voice communication to many or all of the radio in the communication system.

Figure 2:
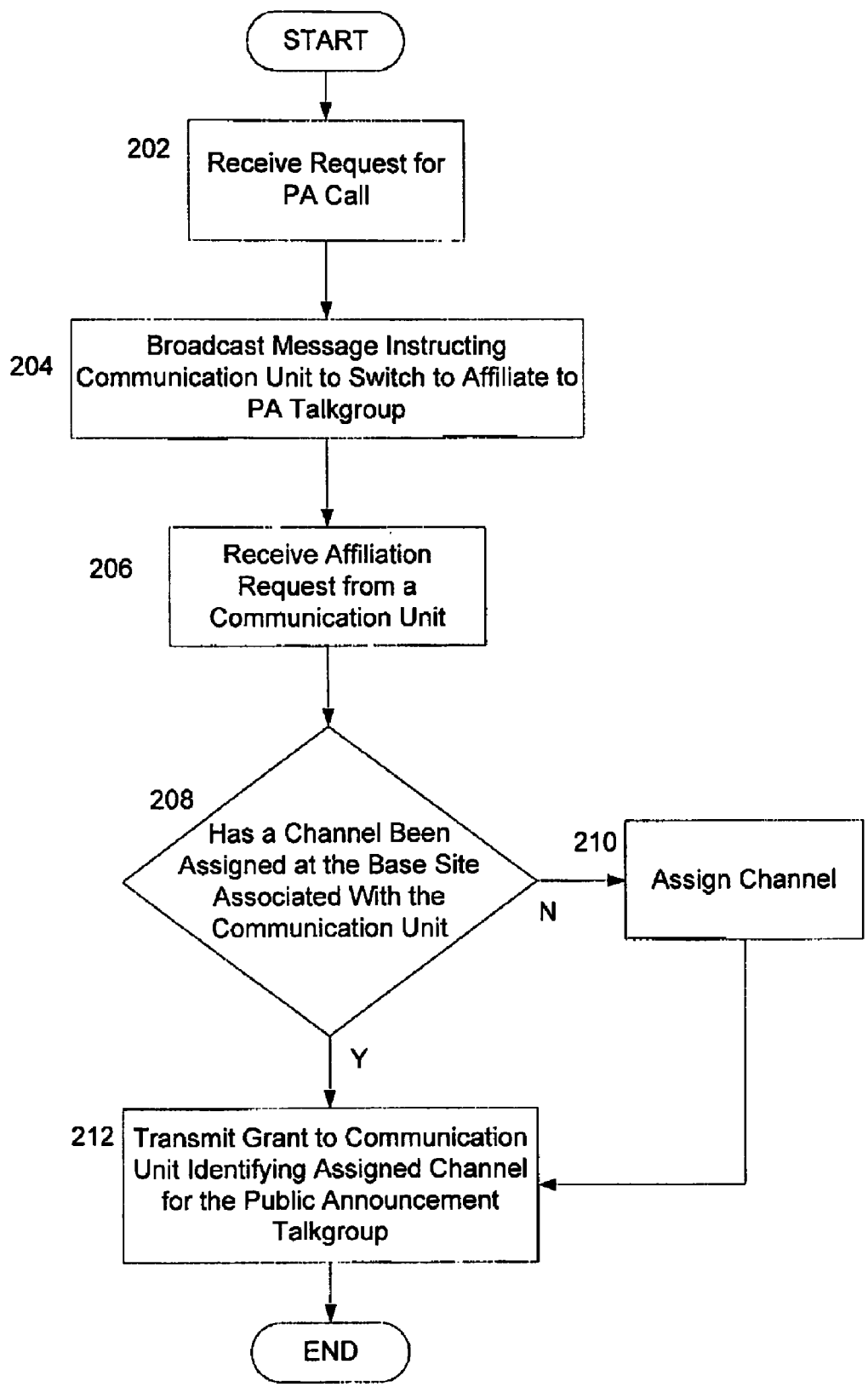
FIG. 2 illustrates one embodiment of a process for initiating a public announcement call in accordance with the present disclosure.

FIG. 2 shows one embodiment of a process for initiating a public announcement call. In step 202, a request is received by the zone controller 130 for the initiation of a public announcement call. Such requests may be made by dispatchers at a console site 150, by a user of a communication unit 140, or the like. In step 204, a broadcast data message is transmitted on a broadcast communication channel instructing communication units 140 to affiliate to a public announcement talkgroup. For purposes of this disclosure, such broadcast data messages are also referred to herein as a public announcement message or PA message. In step 206, an affiliation request is received from a communication unit 140 requesting permission to affiliate to the public announcement talkgroup identified in the public announcement message. In one embodiment, the affiliation request may be received via a control channel. As would be understood by one skilled in the art, a control channel is a communication channel that is utilized by the communication system 100 for transmitting and receiving various types of control messages. The control channel may be a dedicated channel used solely for control messages or may be a communication channel that is also used for voice, data, or other media messages.

After receiving the affiliation request, the zone controller 130 determines whether a voice communication channel has already been assigned at the base site 110 associated with the communication unit 140 that transmitted the affiliation request in step 208. If a voice communication channel has not already been assigned, the zone controller 130 assigns a voice communication channel for the public announcement call in step 210 and the process proceeds to step 210. If a voice communication channel has already been assigned (typically in response to a previous affiliation request at the same base site), the process proceeds directly to step 210.

In step 210, an affiliation grant identifying the assigned voice communication channel is transmitted to the communication unit 140 that sent the affiliation request. The communication unit 140, in response to receiving the affiliation grant, moves to the assigned voice communication channel and joins the indicated public announcement talkgroup.

Figure 3:
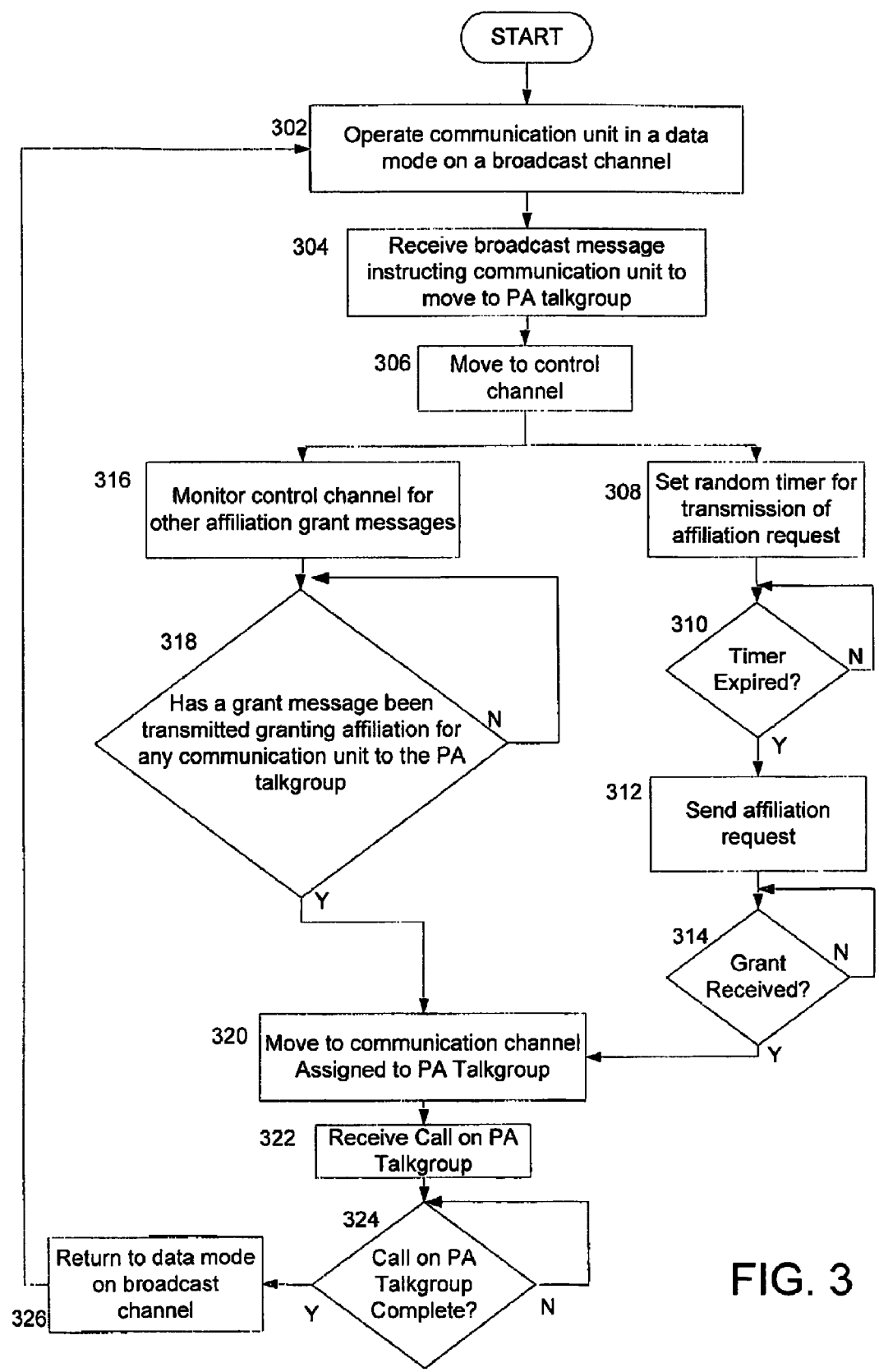
FIG. 3 illustrates one embodiment of a process for receiving and managing broadcast public announcement messages in accordance with the present disclosure.

FIG. 3 illustrates one exemplary method for receiving and processing a broadcast message announcing a public announcement call at a communication unit 140 in accordance with the present disclosure. In step 302, the communication unit 140 is operating in a data mode and is receiving data messages on a broadcast communication channel. In step 304, the communication unit 140 receives, from a base site 100, a broadcast message announcing a public announcement call and instructing the communication unit 140 to affiliate to a public announcement talkgroup. After receiving the public announcement message, the communication unit 140 moves from the broadcast communication channel to a control channel in step 306 and initiates a random affiliation request timer in step 308.

Once the random affiliation request timer is determined to have expired in step 310, the communication unit 140 transmits an affiliation request to the base site 110 on the control channel in step 312. As will be understood from the below discussion, the random affiliation request timer causes affiliation requests from various communication units to be transmitted at various times in order to reduce the risk of potential conflicts between such affiliation requests.

If an affiliation grant is received back from the base site in step 314, the communication unit 140 considers itself affiliated with the public announcement talkgroup and moves to the voice communication channel in step 320. Although not illustrated in this figure, the communication unit 140 may also be configured to retry transmission of an affiliation request if the previous affiliation requests collided with another message (such as an affiliation request from another communication unit) or if an affiliation grant has not been received for a predetermined amount. The amount of time between retransmission attempts, and the number of times that such retransmission attempts are made are a matter of design choice.

At the same time that the communication unit 140 is waiting to transmit an affiliation request, the communication unit 140 also monitors other messages on the control channel in step 316. If, in step 318, an affiliation grant is detected for another communication unit attempting to affiliate to the same public announcement talkgroup, the communication unit cancels its random affiliation request timer and considers itself affiliated as well, in which case the communication unit moves to the voice communication channel and joins the public announcement talkgroup in step 320.

After the communication unit 140 has moved to the voice communication channel, the communication unit begins receiving the public announcement call in step 322. Once the public announcement call times out or is otherwise considered complete in step 324, the communication unit returns back to data mode in step 326. In one embodiment, this may involve the communication unit affiliating to a "dummy" talkgroup so that it will not receive any other public announcements or voice communications that are not intended for this communication unit. Thus, in one embodiment, the communication unit may utilize the same process as described in step 308-318 to affiliate to the "dummy" talkgroup when returning to data mode.

By means of the above-described process, collisions between affiliation requests are significantly reduced. Additionally, a large number of communication units can become affiliated with a public announcement talkgroup without requiring affiliation requests and affiliation grants to be transmitted for each one of the communication units. This not only decreases the load on the control channel but also decreases the amount of time that is required before the public call is initiated.

Figure 4:
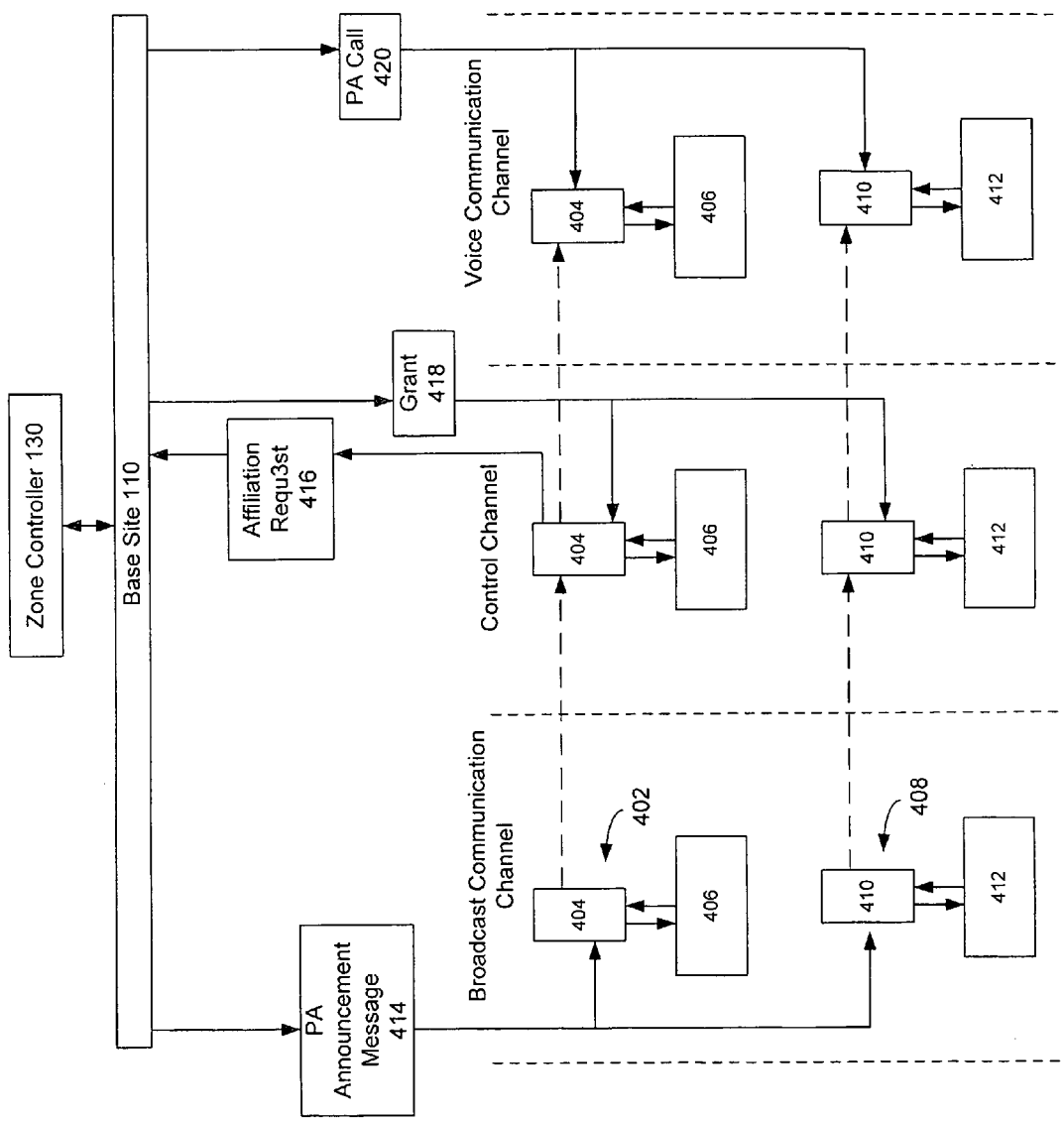
FIG. 4 illustrates an example of a communication system utilizing the present disclosure.

FIG. 4 illustrates an example of a communication system utilizing the present disclosure. In this example, two communication units 402 and 408 are used to describe the functionality of the present disclosure, although it would be understood that numerous communication units may be employed. In the illustrated embodiment, the first communication unit 402 comprises a radio device 404 coupled to a secondary device 406 running application software. Similarly, the second communication unit 408 also comprises a radio device 410 coupled to a secondary device 412 running the application software. Of course, as noted above, the application software may also be integral to the radio device.

As shown in FIG. 4, when a public announcement message 414 is received by the communication units 402, 408, the public announcement message 414 is passed from the radio device 402, 406 to the coupled application software 404, 408, respectively. The application software extracts the information from the message and instructs the respective radio device to switch to the control channel. Each of the radio devices then initiates its random affiliation request timer.

In FIG. 4, let us assume that the random affiliation request timer of the first communication unit expires first and therefore the first communication unit 402 transmits an affiliation request 414 on the control channel. The base site 110 receives the affiliation request 414 and passes the affiliation request to the zone controller 130. The zone controller 130 assigns a voice communication channel to the public announcement call for the base site 110, and transmits an affiliation grant 416 on the control channel. After receiving the affiliation grant 416, the first communication unit 402 moves to the voice communication channel to receive the public announcement call 418.

During this time, the second communication unit 408 is also monitoring the control channel for other messages. Upon detecting an affiliation grant being sent to the first communication unit 402, which was attempting to affiliate to the same public announcement talkgroup, the second communication unit 408 cancels its random affiliation request timer, considers itself affiliated to the public announcement talkgroup as well, and similarly moves to the voice communication channel to join the public announcement call 418. As a result, both the first and second communication units have joined the public announcement talkgroup without requiring both communication units to receive separate affiliation grants.

Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure cover all such modifications and variations provided they come within the scope of the following claims and their equivalents.

What is claimed is:

1. A method for managing call affiliations at a first communication unit in a communication system comprising:
   operating the first communication unit on a first communication channel;
   receiving a broadcast data message on the first communication channel instructing the first communication unit to affiliate to a voice call talkgroup;
   initiating a random affiliation request timer, wherein an affiliation request is transmitted by the first communication unit on a control channel upon expiration of the random affiliation request timer, the affiliation request being configured to request affiliation of the first communication unit to the voice call talkgroup indicated in the broadcast data message;
   monitoring the control channel for a presence of an affiliation grant being transmitted to the first communication unit or to a second communication unit attempting to affiliate to the voice call talkgroup; and
   joining the voice call talkgroup on a second communication channel upon either: (1) receiving the affiliation grant in response to the affiliation request transmitted by the first communication unit, or (2) detecting the affiliation grant being transmitted to the second communication unit attempting to affiliate to the voice call talkgroup.

2. The method of claim 1 wherein the first communication channel is a broadcast communication channel configured for transmitting data messages.

3. The method of claim 1 wherein the second communication channel is a voice communication channel configured for transmitting voice calls.

4. The method of claim 1 wherein the voice call talkgroup is a public announcement talkgroup.

5. The method of claim 1 further comprising canceling the random affiliation request timer if the first communication unit joined the voice call talkgroup on the second communication channel based upon detecting the affiliation grant being transmitted to the second communication unit.

6. The method of claim 5 wherein the step of canceling the random affiliation request timer occurs prior to the expiration of the random affiliation request timer.

7. The method of claim 1 wherein the first communication unit comprises a radio device coupled to a software application for processing data messages.

8. The method of claim 7 wherein the software application is provided on a secondary device coupled to the radio device.

9. A system for managing call affiliations comprising:
a base site;
a plurality of communication units in wireless communication with the base site; and
a zone controller coupled to the base site, the zone controller being configured to (a) cause a broadcast data message to be transmitted from the base site to the plurality of communication units instructing the plurality of communication units to affiliate to a voice call talkgroup, (b) receive affiliation requests from at least one of communication units via the base site, and (c) in response to receiving an affiliation request from a communication unit, cause an affiliation grant to be transmitted to the communication unit that initiated the affiliation request;
wherein, in response to receiving the broadcast data message, each of the plurality of communication units is configured to (a) initiate a random affiliation request timer, whereby the affiliation request is transmitted on a control channel upon expiration of the random affiliation request timer, (b) monitor the control channel for a presence of the affiliation grant being transmitted to any one of the plurality of communication units attempting to affiliate to the voice call talkgroup, and (c) join the voice call talkgroup upon detecting the affiliation grant being transmitted to any one of the plurality of communication units attempting to affiliate to the voice call talkgroup.

10. The system of claim 9 wherein the broadcast data message is transmitted on a broadcast communication channel.

11. The system of claim 10 wherein joining the voice call talkgroup comprises switching to a voice communication channel identified in the affiliation grant.

12. The system of claim 9 wherein the affiliation request and the affiliation grant are transmitted on a control channel.

13. The system of claim 9 wherein each of the plurality of communication units is further configured to cancel its random affiliation request timer if it joined the voice call talkgroup upon detecting an affiliation grant being transmitted to a different communication unit attempting to affiliate to the voice call talkgroup.

14. The system of claim 9 wherein each of the plurality of communication units comprises a radio device coupled to a software application for processing data messages.

15. The system of claim 14 wherein the software application is provided on a secondary device coupled to the radio device.

16. A communication system comprising a first communication unit being in wireless communication with at least one base site, the communication unit being configured to (a) receive a broadcast data message on a broadcast communication channel instructing the first communication unit to affiliate to a voice call talkgroup; (b) initiate a random affiliation request timer, wherein an affiliation request is transmitted by the first communication unit on a control channel upon expiration of the random affiliation request timer, (c) monitor the control channel for the presence of an affiliation grant being transmitted to the first communication unit or to a second communication unit attempting to affiliate to the voice call talkgroup; and (d) join the voice call talkgroup on a voice communication channel upon detecting the affiliation grant being transmitted to either of the first communication unit or the second communication unit attempting to affiliate to the voice call talkgroup.

17. The system of claim 16 wherein the communication unit comprises a radio device coupled to a software application for processing data messages.

18. The system of claim 17 wherein the software application is provided on a secondary device coupled to the radio device.

19. The system of claim 16 wherein the voice call talkgroup is a public announcement talkgroup.

20. The system of claim 16 wherein the first communication unit is further configured to cancel its random affiliation request timer if it joined the voice call talkgroup upon detecting the affiliation grant being transmitted to the second communication unit.

* * * * *